Jan. 25, 1949.　　　　A. R. WOOD　　　　2,460,247
SEWING MACHINE CLUTCH
Original Filed July 15, 1944　　　　　　2 Sheets-Sheet 1
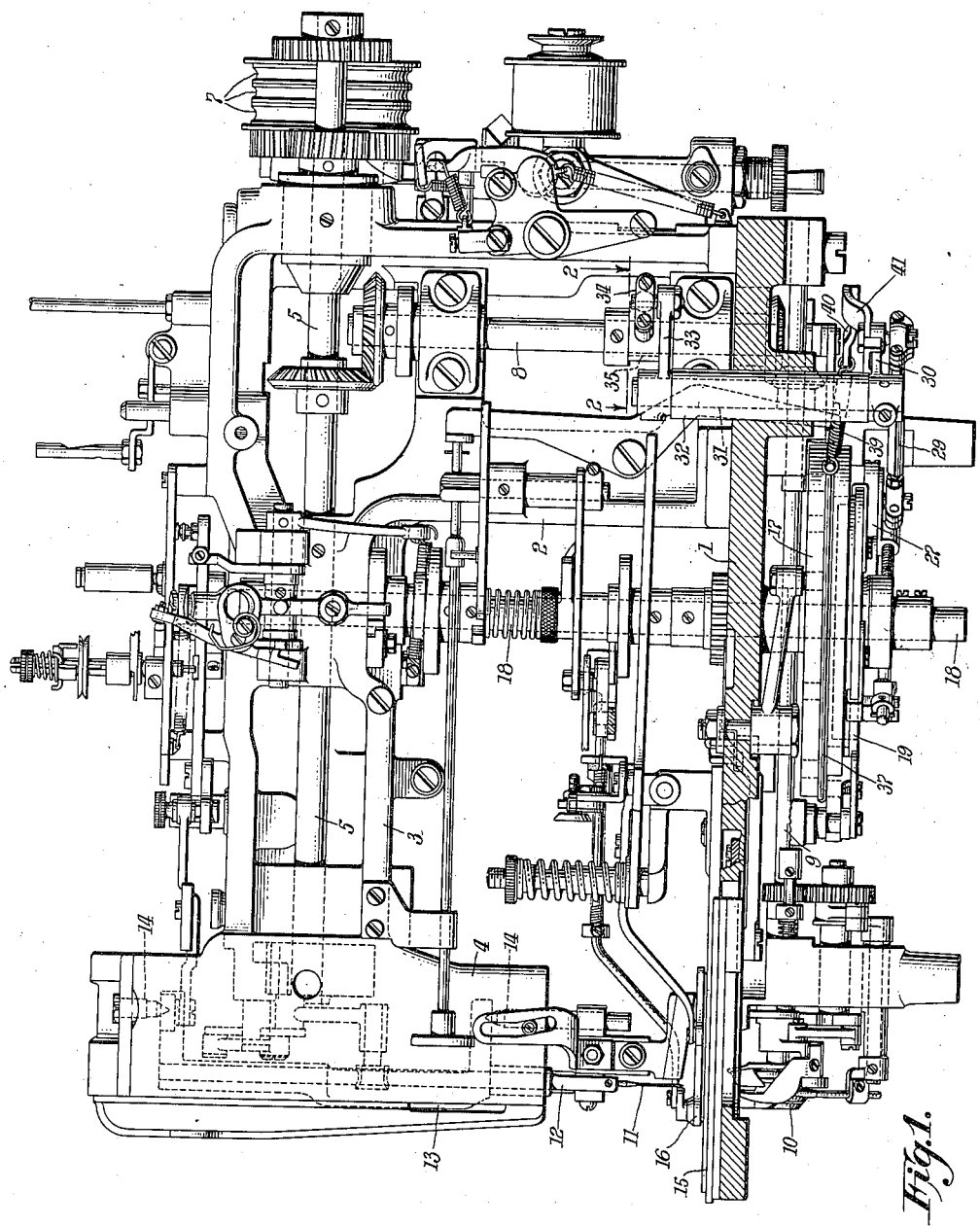
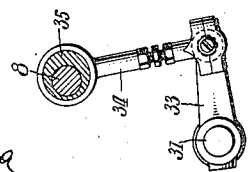
Inventor
Alfred R. Wood
By William F. Stewart
Attorney
Witness:
Godfrey Pecina Jan. 25, 1949.  A. R. WOOD  2,460,247
SEWING MACHINE CLUTCH
Original Filed July 15, 1944  2 Sheets-Sheet 2

Inventor
Alfred R. Wood
By William P. Stewart
Attorney

Patented Jan. 25, 1949

2,460,247

UNITED STATES PATENT OFFICE 2,460,247

SEWING-MACHINE CLUTCH

Alfred R. Wood, Bridgeport, Conn., assignor to The Singer Manufacturing Company, Elizabeth, N. J., a corporation of New Jersey Original application July 15, 1944, Serial No. 545,035. Divided and this application June 12, 1945, Serial No. 599,061

6 Claims. (Cl. 74—126)

This invention relates to clutches and is especially concerned with those of the one-way type and commonly referred to as the Horton type. This application is a division of my co-pending application Serial No. 545,035, filed July 15, 1944, now Patent No. 2,411,493, Nov. 19, 1946.

In clutches of the type in question, there is a movable or live driving element which coacts through suitable balls, cylinders or the like, with a driven element to impart to the driven element an intermittent or one-way actuation. In operation, the live driving element becomes locked with said driven element when slight relative rotation of the parts occurs in one direction, and becomes unlocked when reverse relative rotation occurs. When the driving and driven elements are locked together they turn as one during the effective advancing stroke imparted to the driving member. At the end of the advancing stroke the direction of movement of the driving member is reversed, thus unlocking the driving element from the driven element.

To prevent overthrow of the driven element when reversal of the driving member occurs, it has been customary heretofore to apply a braking force to the driven element. A disclosure of the type of brake commonly used may be seen in the U. S. patent of E. B. Allen, No. 862,125, Aug. 6, 1907. The clutch-brake illustrated in the Allen patent is adapted to apply a uniformly constant load on the driven element of the clutch. While this effectively minimizes overthrow of the clutch, it adds a load to the inertia of the parts, which must be overcome by the actuating means of the live clutch element when it initially engages to advance the driven element. This additional load at the beginning of the locking of the driving and driven elements results in objectionable slippage between the elements.

It is the primary objective of the present invention to provide clutch braking means which applies to the driven element of the clutch a minimum of braking action at the beginning of the clutch actuating stroke and a maximum of braking action at the end of the clutch actuating stroke.

Another object of the present invention is the provision of clutch overthrow preventive means which functions to exert a minimum of braking action at the beginning of the clutch actuating stroke; the braking action gradually increasing to a maximum at the end of the clutch actuating stroke.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the accompanying drawings, Fig. 1 is a right side elevational view, partly in section, of a buttonhole sewing machine embodying the invention.

Fig. 2 represents a horizontal sectional view taken substantially along the line 2—2, Fig. 1.

Figures 3, 4:
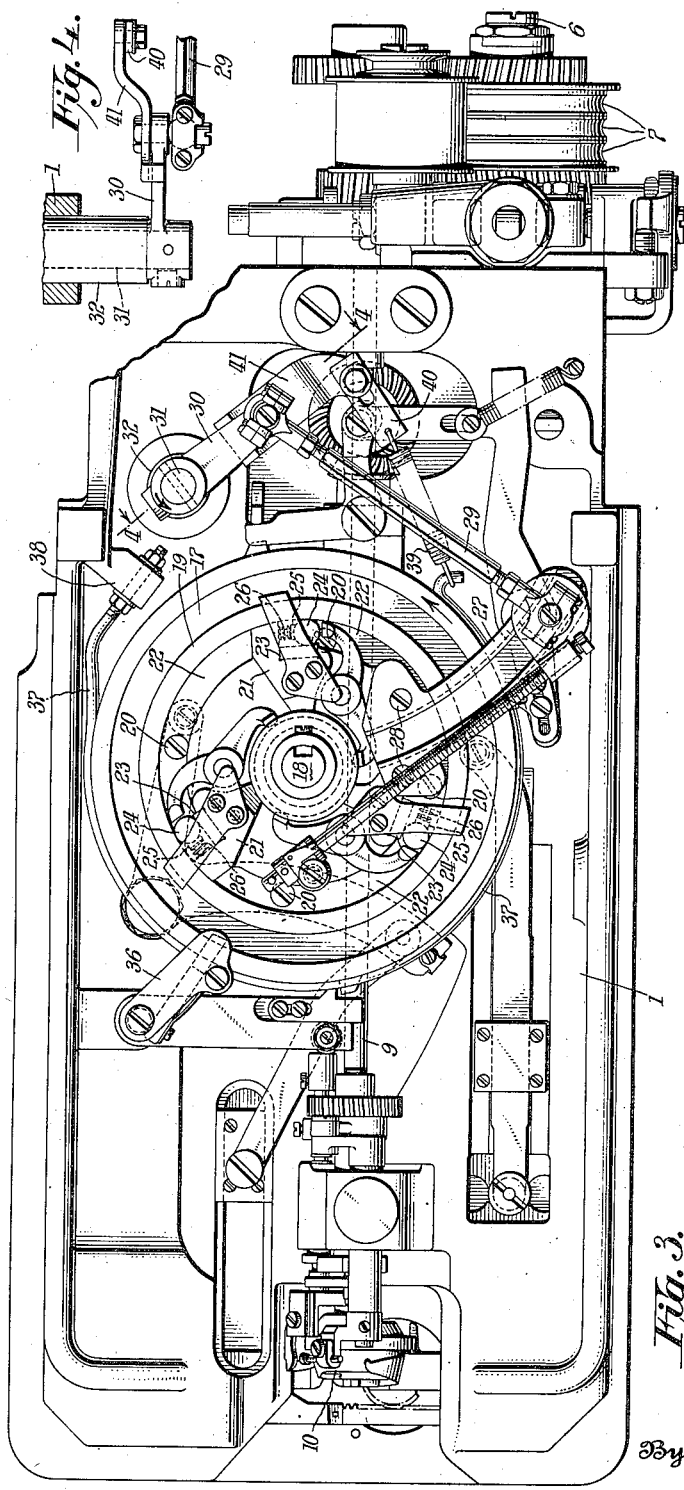
Fig. 3 is a bottom plan view of the machine shown in Fig. 1.
Fig. 4 represents a vertical sectional view taken substantially along the line 4—4, Fig. 3.

Referring to the drawings, the machine chosen for the purposes of the present disclosure has a frame including a bed 1 from which rises a standard 2 of the bracket-arm 3 terminating in a head 4. Journaled in the bracket-arm 3 is a main-shaft 5 connected at its rearward end, by spur-gears, to a countershaft 6 (Fig. 3) driven by a belt adapted to run upon a nest of pulleys 7 carried by the countershaft 6. Journaled within the standard 2 is a vertical shaft 8 geared at its upper end to the main-shaft 5 and at its lower end to a bed- or hook-shaft 9 journaled in the bed 1. Secured to the outer end of the hook-shaft 9 is a rotary loop-taker or hook 10 adapted to cooperate with a thread-carrying needle 11 in the formation of lock-stitches. The needle 11 is carried by the lower end of a needle-bar 12 journaled for endwise reciprocatory movement in spaced bearings formed in a vibratory needle-bar-gate 13 supported upon pintles 14 within the head 4. The needle-bar 12 may derive its reciprocating movements from the main-shaft 5 by means of any usual or suitable connections therewith.

The work to be buttonholed is adapted to be held in a work-clamp comprising the usual lower work-plate 15 and the upper clamp-foot 16, Fig. 1. The work-clamp is slowly moved in step-by-step fashion under the endwise reciprocatory and laterally vibratory needle 11, first away from the standard 2 and then towards the standard to cause the first and second rows of side zigzag stitches to be laid side by side in the work. The work-clamp derives its step-by-step movements from the usual feed-cam 17 carried on a vertically disposed feed-shaft 18 journaled in the bed 1 and bracket-arm 3 of the machine-frame. The connections between the work-clamp and the feed-cam are identical with those fully described in my copending application referred to above. Also, the preferred manner in which the feed-cam 17 is secured to the feed-shaft 18 is fully illustrated and explained in the same copending application.

The feed-cam 17 and the feed-shaft 18 are intermittently rotated by means of a one-way-acting clutch which is actuated through suitable connections with the vertical shaft 8. More specifically, the clutch preferably cmprises an outer driven element or clutch-drum 19 fixed, as shown in Fig. 3, by a plurality of screws 20 to the recessed under surface of the feed-cam 17. Disposed within the clutch-drum 19 is a live driving element or clutch-spider 21 which, together with the clutch-drum 19, forms preferably three suitable cavities 22; the clutch-spider being provided with inclined hardened wear-plates 23. Disposed in each of the cavities 22 is a clutch-member 24 which is engaged by a plunger 25 backed by a coil-spring 26, the plunger acting to bias the clutch member 24 toward the narrow end of the cavity 22 and to wedge the same between the inclined wear-plate 23 and the clutch-surface of the drum 19. The spider 21 is oscillated constantly about the axis of the feed-shaft 18 during the operation of the machine by means of an arcuate shaped actuating lever 27 secured at its inner end by screws 28 to the spider 21. At its other end, the actuating lever 27 is connected by a link 29 to the outer end of a rock-lever 30 carried by the lower end of a vertically disposed actuating rock-shaft 31 (Fig. 1) journaled in a bearing bushing 32 pressed into the machine-bed 1. At its upper end, the rock-shaft 31 has secured thereto a second rock-lever 33 connected to a pitman 34 (Fig. 2); one end of the pitman embracing an eccentric 35 fast on the vertical shaft 8. As the shaft 8 is rotated, the eccentric 35 imparts to the rock-shaft 31 oscillatory movements which, through the rock-lever 30, link 29 and actuating lever 27, oscillate the clutch-spider 21 about the axis of the feed-shaft 18. The clutch-spider 21, through the clutch-members 24, drives the clutch-drum 19 which rotates the feed-cam 17 and feed-shaft 18 intermittently in one direction. Retrograde motion of the feed-cam 17 is prevented by a common form of dog shown as 36 in Fig. 3.

The speed with which the feed-cam 17 is rotated is dependent upon the effective length of the actuatng lever 27. The means employed in the machine chosen to illustrate the present invention, for conveniently varying the effective length of the actuating lever 27, is identical with that disclosed in my copending application of which this is a division. Reference may be had to such application for a complete understanding of the actuating lever adjusting means.

To prevent overthrow of the clutch during the high speed operation of the sewing machine, the feed-cam 17 has embracing its grooved periphery for a major portion thereof a brake in the form of a wire loop 37 adjustably secured at one end preferably to a lug 38 cast integral with the machine-bed 1. At its other end, the wire loop 37 is hooked into one end of a coil-spring 39 connected at its other end to the free end of a member 40 adjustably fastened to an extension 41 fast on the rock-lever 30. It is desirable to adjustably fasten the member 40 to the extension 41 so that the tension of the coil-spring 39 can be properly regulated in accordance with the particular conditions. It will be observed that, as the rock-lever 30 is actuated to rotate the feed-cam 17 (see arrow in Fig. 3), the wire loop 37, through the coil-spring 39, is progressively tightened about the periphery of the feed-cam 17 to such an extent that at the end of the stroke of the rock-lever 30, the wire loop is drawn sufficiently tight about the periphery of the feed-cam to brake the same and preclude any overthrow thereof. During the return stroke of the rock-lever 30, it will be understood that the tension applied to the wire loop 37 will be released. The principal advantage of this type of brake is that, in its initial action to turn the feed-shaft 18, the clutch does not have to overcome, in addition to the inertia of the parts, any appreciable braking force which may be needed at the end of the feed-cam advancing stroke to prevent overthrow of the clutch. In other words, with the improved wire loop brake, no braking action need be overcome at the beginning of the feed-cam advancing stroke, while, as the rock-lever 30 approaches the end of its advancing stroke, the braking action progressively increases to a maximum to prevent overthrow. The gradual increase of the braking action, as the end of the feed-advancing stroke is approached, does not present any difficulty to the successful working of the clutch, inasmuch as the braking action is not applied to the clutch-drum until after the clutch-members 24 are in wedging relation between the clutch-drum 19 and the spider 21. The fact that substantially no braking action exists during the short period of time that the clutch-members 24 are moving into wedging relation minimizes clutch slippage.

It will be observed in the drawings that I have located the wire loop brake 37 in a groove formed in the periphery of the feed-cam 17. It will be appreciated that the same result would be obtained if the brake embraced the periphery of the clutch-drum 19, instead of the feed-cam, inasmuch as the feed-cam 17 and clutch-drum 19 are secured together. It is to be understood that when the rotary driven element of the clutch is referred to, it is to be considered as including the feed-cam 17, as well as the outer clutch-drum 19.

In Fig. 3, it will be seen that the spring 39, through the member 40, is connected to the rock-lever 30 at a point a greater distance from the axis of oscillation of the rock-shaft 31 than is the point of connection of the link 29 with the rock-lever 30. As a result of this, a greater movement is imparted to the spring 39 than is imparted to the link 29 during each stroke of the rock-lever. The large distance through which the spring 39 must expand permits the use of a coil-spring set so that it exerts only a slight amount of initial tension, the full expansion of the spring during the advancing stroke of the rock-lever 30 increasing the tension exerted by the spring to an ample amount to effect proper brake action. The slight initial tension aids in minimizing the load to be absorbed by the clutch and therefore aids in reducing the slippage of the clutch.

Having thus set forth the nature of the invention, what I claim herein is:

1. A driving mechanism of the class described, including an intermittent clutch having a driven element and a driving element having an advancing stroke and a return stroke, means for imparting the advancing and return strokes to said driving element, and a brake applying member engageable with said driven element for exerting a minimum of braking pressure at the beginning of the advancing stroke and a maximum of braking pressure at the termination of the advancing stroke, said brake applying member having one end stationary and its other end continuously connected to said driving element actuating means.

2. A driving mechanism of the class described, including an intermittent clutch having a driven element and a driving element having an advancing stroke and a return stroke, means for imparting the advancing and return strokes to said driving element, and an overthrow prevention device associated with said driven element including a member engageable with said driven element, a spring connected to said member, and means continuously connecting said overthrow prevention device directly with the means for imparting advancing and return strokes to said driving element.

3. A driving mechanism of the class described, including an intermittent clutch having a driven element and a driving element having an advancing stroke and a return stroke, means for imparting the advancing and return strokes to said driving element, and an overthrow prevention device associated with said driven element including a wire loop member embracing said driven element, a spring connected to said member, means for regulating the initial pressure of said spring, and means continuously connecting said overthrow prevention device with the means for imparting the advancing and return strokes to said driving element.

4. A one-way clutch device, comprising, a rotary driven-element including a clutch-drum, an oscillatory driving-element, clutch-means associated with said driving-element for engagement with said clutch-drum in one direction of movement of said driving-element, means for actuating said driving-element, a brake-member circumferentially embracing said rotary driven-element, and means including an operative connection with said driving-element actuating means for progressively increasingly tightening said brake-member upon said clutch-drum during the entire clutch-drum advancing movement of said driving-element.

5. A driving mechanism of the class described, including an intermittent clutch having a rotary driven element and a driving element, an actuating rock-shaft, a rock-lever secured to said rock-shaft, means connecting said rock-lever with said clutch driving element for imparting and advancing stroke and a return stroke to said clutch driving element, and an overthrow prevention device associated with said clutch driven element including a brake-member engageable with said driven element, and a spring connected at one end directly to said brake-member and at its other end to said rock-lever whereby said brake-member is operated to exert a minimum of braking pressure at the beginning of the advancing stroke and a maximum of braking pressure at the termination of the advancing stroke.

6. A driving mechanism of the class described, including an intermittent clutch having a rotary driven element and a driving element, a lever secured to said driving element, an actuating rock-shaft, a rock-lever secured to said rock-shaft, a link connecting said rock-lever with the lever on said driving element, and an overthrow prevention device including a flexible brake-member embracing said rotary driven element, means fixedly securing one end of said brake-member and a spring connected to the other end of said brake-member and to said rock-lever, the point of connection of said spring with said rock-lever being a greater distance from the center of said actuating shaft than is the point of connection of said link with said rock-lever.

ALFRED R. WOOD.

REFERENCES CITED

The following references are of record in the file of this patent:

UNITED STATES PATENTS

| Number | Name | Date |
| --- | --- | --- |
| 115,806 | Bailey | June 13, 1871 |
| 320,419 | Walters | June 16, 1885 |
| 345,468 | Wilmott | July 13, 1886 |
| 1,896,732 | Stone | Feb. 7, 1933 |
| 2,119,111 | Minkowitz | May 31, 1938 |
| 2,166,716 | Chandler | July 18, 1939 |
| 2,360,075 | Schoij | Oct. 10, 1944 |